United States Patent
Fujii

(10) Patent No.: US 11,056,988 B2
(45) Date of Patent: Jul. 6, 2021

(54) DRIVE UNIT AND MOTOR SYSTEM FOR BRUSHLESS DC MOTORS

(71) Applicant: MABUCHI MOTOR CO., LTD., Matsudo (JP)

(72) Inventor: Shunpei Fujii, Funabashi (JP)

(73) Assignee: MABUCHI MOTOR CO., LTD., Matsudo (JP)

(*) Notice: Subject to any disclaimer, the term of this patent is extended or adjusted under 35 U.S.C. 154(b) by 24 days.

(21) Appl. No.: 16/806,538

(22) Filed: Mar. 2, 2020

(65) Prior Publication Data

US 2020/0287484 A1    Sep. 10, 2020

(30) Foreign Application Priority Data

Mar. 4, 2019  (JP) ............................. JP2019-038808

(51) Int. Cl.
*H02P 6/15* (2016.01)

(52) U.S. Cl.
CPC .................... *H02P 6/153* (2016.02)

(58) Field of Classification Search
CPC ....................................... H02P 6/153
USPC .................. 318/400.14, 400.13, 400.01, 700
See application file for complete search history.

(56) References Cited

U.S. PATENT DOCUMENTS 8,810,167 B2 * 8/2014 Suzuki .................. H02P 21/50
318/400.01
2004/0183488 A1  9/2004 Fuse

FOREIGN PATENT DOCUMENTS

JP           2004-242432 A       8/2004

* cited by examiner

*Primary Examiner* — David Luo
(74) *Attorney, Agent, or Firm* — Myers Wolin, LLC

(57) ABSTRACT

A waveform control unit outputs a signal for driving a brushless DC motor by intermediate value energization to a waveform output unit, and outputs a signal for driving a brushless DC motor by sine wave energization to the waveform output unit when the signal in which the rotation position of the rotation reference is detected is acquired from the element, and the waveform control unit applies voltage corresponding to a sine value of an angle of a winding of one phase of n-phase windings when the brushless DC motor is to be driven by intermediate value energization, and outputs a signal for applying voltage corresponding to a sine value of an angle having similar phase difference as the sine wave energization drive with respect to the angle to the rest of the windings.

9 Claims, 3 Drawing Sheets

[Fig. 1]
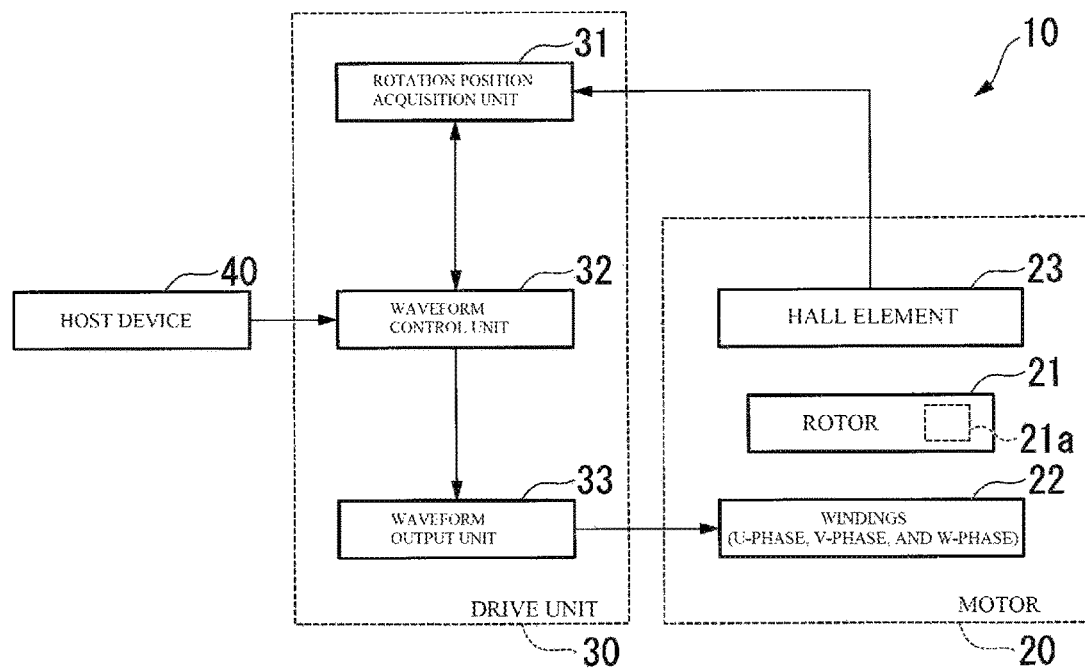

[Fig. 2]
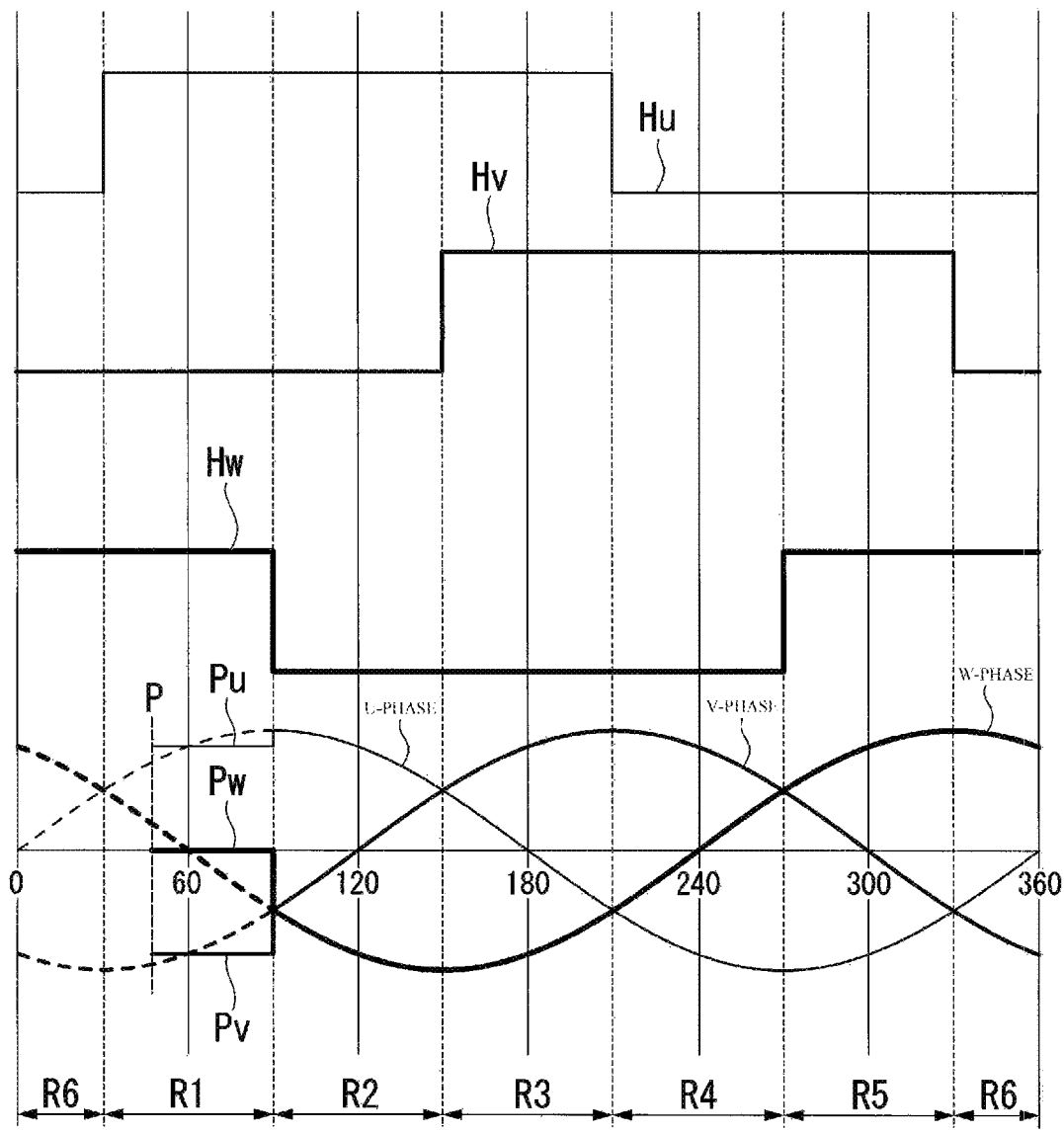

[Fig. 3]
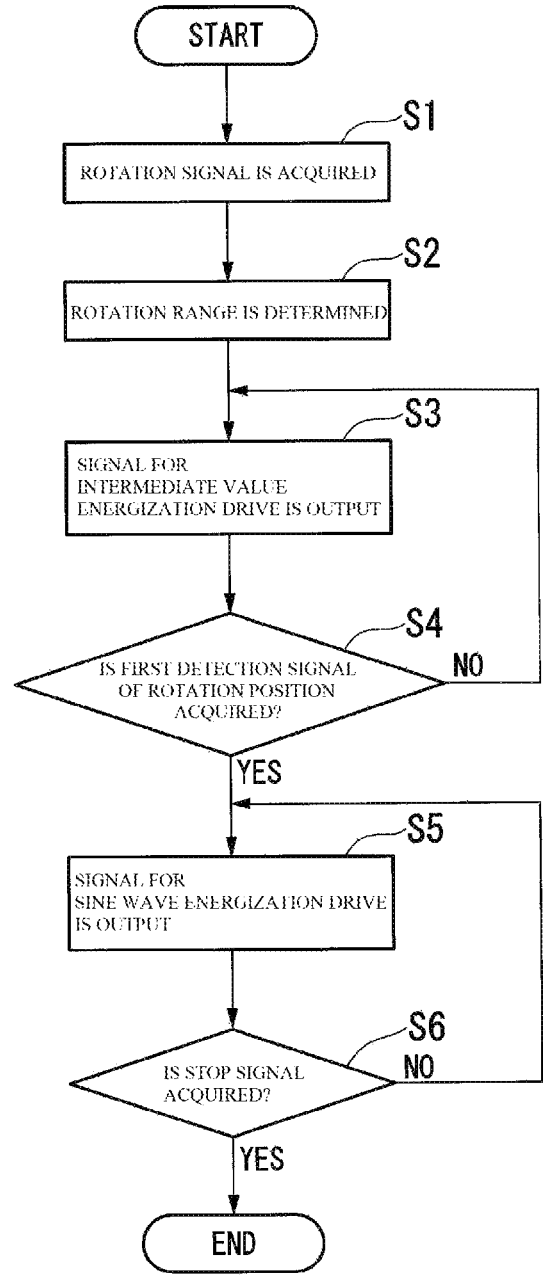

DRIVE UNIT AND MOTOR SYSTEM FOR BRUSHLESS DC MOTORS

CROSS-REFERENCE TO THE RELATED APPLICATION

This application claims priority to Japanese Patent Application No. 2019-038808, filed Mar. 4, 2019, the entire contents of which is incorporated herein by reference.

BACKGROUND

Technical Field

The present disclosure relates to a drive unit and a motor system for brushless DC motors.

Related Art

As a method of driving a brushless DC motor, sine wave energization drive is known. The sine wave energization drive has higher efficiency compared with rectangular wave energization drive.

A hall element is adopted as a position detection element of a rotor in a brushless DC motor. By adopting a hall element, the cost of the brushless DC motor can be reduced.

However, in a brushless DC motor adopting a hall element, the energization timing deviates (becomes late or early) when the rotation number is low such as a starting time. As a result, the torque drops.

In order to address the above issue, a brushless DC motor drive unit described in JP 2004-242432 A is known. In this drive unit, rectangular wave energization drive is performed until a fixed rotation number is reached after the motor is started, and sine wave energization drive is performed after the fixed rotation number is reached. This allows suppression of torque drop.

SUMMARY

However, in the typical drive unit for brushless DC motors, noise and vibration become large at a low rotation number (at the time of rectangular wave energization drive).

The present disclosure has been made in light of the above circumstances, and the purpose is to suppress the generation of noise and vibration while suppressing the torque drop at a low rotation number.

The present disclosure proposes the method below to address the above issue.

The drive unit for brushless DC motors according to an embodiment of the present disclosure is a drive unit for a brushless DC motor including a rotor, n-phase (n is a natural number of two or more) windings that rotate the rotor, and an element that detects a rotation position of a rotation reference provided on the rotor at a predetermined interval, the drive unit including: a rotation position acquisition unit that acquires a signal from the element; a waveform control unit that acquires a signal from each of a host device and the rotation position acquisition unit; and a waveform output unit that applies voltage to the n-phase windings based on the signal from the waveform control unit. The waveform control unit outputs a signal for driving the brushless DC motor by intermediate value energization to the waveform output unit after a rotation start signal is acquired from the host device until a signal in which the rotation position of the rotation reference is detected is first acquired from the element, and outputs a signal for driving the brushless DC motor by sine wave energization to the waveform output unit when the signal in which the rotation position of the rotation reference is detected is acquired from the element, and the waveform control unit applies voltage corresponding to a sine value of an angle θM of a winding one phase of the n-phase windings (the angle θM is a predetermined angle included in a rotation range having the rotation reference positioned when the rotor is stopped among a plurality of rotation ranges that are divided in accordance with the rotation position detected by the element) when the brushless DC motor is to be driven by intermediate value energization, and outputs a signal for applying voltage corresponding to a sine value of an angle having similar phase difference as the sine wave energization drive with respect to the angle θM to the rest of the windings.

In this case, for example, the voltage value applied to the winding of each phase can be set to a suitable value in terms of output efficiency, as compared with a case where a brushless DC motor is driven by rectangular wave energization at the start of rotation. This allows suppressing the generation of noise and vibration while suppressing the torque drop at a low rotation number.

In each of the plurality of rotation ranges, the voltage value applied to each of the n-phase windings from a start point θS to an end point θE of the rotation range at the time of the sine wave energization drive monotonously increases or monotonous decreases, and the angle θM may be an intermediate angle of the rotation range having the rotation reference positioned when the rotor is stopped.

In this case, even if the rotation reference of the rotor is positioned on the start point θS side or on the end point θE side within the rotation range, the voltage value applied to the winding of each phase can be set to a suitable value in terms of output efficiency.

The intermediate angle of the rotation range is not limited to the median value (that is, (θS+θE)/2) of the start point θS and the end point θE of the rotation range. The intermediate angle of the rotation range may have a difference (for example, 10% of (θE−θS)) with respect to the median value to a degree that does not cause an issue in terms of output efficiency.

The waveform control unit may determine the rotation range having the rotation reference positioned when the rotor is stopped based on the signal from the rotation position acquisition unit.

In this case, for example, the rotation range having the rotation reference positioned when the rotor is stopped does not have to be stored beforehand, and the device configuration (storage device) can be simplified.

The n-phases winding are three-phase windings, and the element may detect the rotation position of the rotation reference at an interval of an electrical angle of 60°.

In this case, for example, a drive unit can be applied to a general three-phase two-pole brushless DC motor.

The element may be a hall element.

In this case, for example, the cost of the drive unit can be reduced.

The motor system according to an embodiment of the present disclosure includes a brushless DC motor including a rotor, n-phase (n is a natural number of two or more) windings that rotate the rotor, and an element that detects a rotation position of a rotation reference provided on the rotor at a predetermined interval; and the drive unit for the brushless DC motor.

According to an embodiment of the present disclosure, it is possible to suppress the generation of noise and vibration while suppressing the torque drop at a low rotation number.

BRIEF DESCRIPTION OF DRAWINGS

FIG. 1 is a control block diagram of a motor system according to an embodiment of the present disclosure;

FIG. 2 is a time chart describing drive voltage of the motor system shown in FIG. 1; and FIG. 3 is a flowchart describing a control method of the motor system shown in FIG. 1.

DETAILED DESCRIPTION

Hereinafter, a motor system 10 according to an embodiment of the present disclosure will be described with reference to the drawings.

As shown in FIG. 1, the motor system 10 includes a brushless DC motor 20 (hereinafter, referred to as a motor 20) and a drive unit 30 for the motor 20. The motor system 10 may have a configuration in which the motor 20 and the drive unit 30 are integrated (so-called an intelligent motor) or a configuration in which the motor 20 and the drive unit 30 are not integrated.

The motor 20 includes a rotor 21, n-phase (n is a natural number of two or more) windings 22 (coil) that face the rotor 21 in a radial direction and rotate the rotor 21, and a hall element 23 (element) that detects the rotation position of a rotation reference 21a provided on the rotor 21 at an interval of a predetermined electrical angle θR.

The rotor 21 has two magnetic poles. In the motor 20, the mechanical angle and the electrical angle coincide with each other. The rotation reference 21a of the rotor 21 is, for example, a boundary of two magnetic poles. The rotor 21 may have four or more magnetic poles. The rotor 21 may be an inner rotor or an outer rotor. The rotor 21 may be an embedded magnet type or a surface magnet type.

The motor 20 includes three-phase windings 22. In other words, the n=3. The windings 22 includes a U-phase winding 22, a V-phase winding 22, and a W-phase winding 22. The windings 22 are wound around a stator. The number of slots (number of teeth) of the stator can be set to an arbitrary multiple (3, 6, 9, or the like in the present embodiment) of the number of phases (3 in the present embodiment) for example.

The hall element 23 detects the rotation position of the rotation reference 21a of the rotor 21 at an interval of an electrical angle of 60°. In other words, the θR=60°. In the present embodiment, the mechanical angle and the electrical angle coincide with each other, and the hall element 23 detects the rotation position of the rotor 21 at an interval of a mechanical angle of 60°. When the hall element 23 detects the rotation position of the rotor 21 at an interval of an electrical angle of 60°, six (a plurality of) rotation ranges are divided every 60° in the electrical angle of 360°.

The drive unit 30 includes, for example, a microcomputer. The drive unit 30 rotates the motor 20 based on a signal from a host device 40. The drive unit 30 includes a rotation position acquisition unit 31, a waveform control unit 32, and a waveform output unit 33.

The rotation position acquisition unit 31 acquires a signal from the hall element 23. The rotation position acquisition unit 31 includes, for example, a hall amplifier. The rotation position acquisition unit 31 amplifies the signal (output) from the hall element 23 and outputs the signal to the waveform control unit 32.

The waveform control unit 32 includes, for example, a PWM drive circuit and a PWM comparator. The waveform control unit 32 acquires signals from each of the host device 40 and the rotation position acquisition unit 31. The waveform control unit 32 acquires ON/OFF signals for starting/stopping the motor 20 and a signal serving as a target value of the rotation number of the motor 20 from the host device 40. The waveform control unit 32 acquires a signal related to the rotation position of the rotation reference 21a of the rotor 21 from the rotation position acquisition unit 31.

The waveform control unit 32 determines, for example, a duty ratio or the like based on signals from each of the host device 40 and the rotation position acquisition unit 31. The waveform control unit 32 outputs a signal for energizing the windings 22 to the waveform output unit 33 based on signals from each of the host device 40 and the rotation position acquisition unit 31.

The waveform output unit 33 includes, for example, a predriver and an inverter circuit (driver). The waveform output unit 33 applies voltage to the three-phase windings 22 based on a signal from the waveform control unit 32 to rotate the rotor 21.

Next, a method of driving the motor 20 in the motor system 10 (a control method of the motor system 10) will be described with reference to FIG. 2 and FIG. 3. In this driving method, sine wave energization drive is basically used as a driving method. In the following, sine wave energization drive will be described first.

As shown in the lower part of FIG. 2, in sine wave energization drive, sinusoidal voltage having a phase shifted is input to the winding 22 of each phase. In the illustrated example, sinusoidal voltage applied to the U-phase winding 22 is used as a reference. Sinusoidal voltage having a phase shifted by an electric angle of −120° with respect to the sinusoidal voltage of the U-phase is applied to the V-phase winding 22. Sinusoidal voltage having a phase shifted by an electric angle of −240° with respect to the sinusoidal voltage of the U-phase is applied to the W-phase winding 22. The application of these sinusoidal voltages is realized, for example, by the application of pulse voltage having a duty ratio adjusted.

As shown in the upper part of FIG. 2, three hall elements 23 are provided corresponding to the three-phase windings 22. The three hall elements 23 are arranged at intervals (equal intervals) in the rotation direction of the rotor 21 at an electric angle of 120° (also at a mechanical angle of 120° because two poles are a pair in this embodiment). The three hall elements 23 include a U-phase hall element 23, a V-phase hall element 23, and a W-phase hall element 23.

The three hall elements 23 switch the output value in accordance with the position of the rotation reference 21a of the rotor 21. The U-phase hall element 23 switches the output value (Hu shown in FIG. 2) when the rotation reference 21a is positioned at 30° and 210°. The V-phase hall element 23 switches the output value (Hv shown in FIG. 2) when the rotation reference 21a is positioned at 150° and 330°. The W-phase hall element 23 switches the output value (Hw shown in FIG. 2) when the rotation reference 21a is positioned at 90° and 270°.

By combining the output values of the three hall elements 23, it is possible to divide the electrical angle of 360° into six rotation ranges, which are (1) a first rotation range R1 of 30° to 90°, (2) a second rotation range R2 of 90° to 150°, (3) a third rotation range R3 of 150° to 210°, (4) a fourth rotation range R4 of 210° to 270°, (5) a fifth rotation range R5 of 270° to 330°, and (6) a sixth rotation range R6 of 330° to 30° (390°). In any of the first rotation range R1 to the sixth rotation range R6, as shown in the lower part of FIG. 2, the voltage value of the sinusoidal voltage applied to the U-phase winding 22, the V-phase winding 22, and the W-phase winding 22 monotonously increases or monotonously decreases from a start point θS to an end point θE of the rotation range.

Next, the flow of the driving method of the motor 20 will be described with reference to FIG. 2 and FIG. 3.

The description will be given on the premise that the rotation reference 21a of the rotor 21 is positioned in (belongs to) a position P (see FIG. 2) in the first rotation range R1 when the rotor 21 is stopped. However, a similar method can be adopted when the rotation reference 21a is positioned in another rotation range (the second rotation range R2 to the sixth rotation range R6).

As shown in FIG. 3, the waveform control unit 32 acquires a rotation start signal (start signal) from the host device 40 (S1), and then determines the rotation range having the rotation reference 21a of the rotor 21 positioned based on the signal from the rotation position acquisition unit 31 (S2). Whether the rotation reference 21a becomes positioned in any one of the first rotation range R1 to the sixth rotation range R6 can be estimated based on the combination of signal values detected from the plurality of hall elements 23.

After the determination of the rotation position (S2), a signal for driving the motor 20 by intermediate value energization is output to the waveform output unit 33 (S3) until a signal in which the rotation position of the rotation reference 21a is detected is first acquired from the hall element 23 (S4: NO).

As shown in FIG. 2, the waveform control unit 32 outputs a signal for applying voltage corresponding to the sine value of an angle θM to the winding 22 of one phase among the three-phase windings 22 when the motor 20 is driven by intermediate value energization (S3). A signal for applying voltage corresponding to the sine value of an angle having a similar phase difference as that of the sine wave energization drive with respect to the angle θM is output to the rest of the three-phase windings 22. At this time, in the present embodiment, constant voltage corresponding to sin θM is applied to the U-phase winding 22. Constant voltage corresponding to sin (θM−120°) is applied to the V-phase winding 22. Constant voltage corresponding to sin (θM−240°) is applied to the W-phase winding 22.

Here, the angle θM is a predetermined angle included in the first rotation range R1 which is the rotation range having the rotation reference 21a positioned when the rotor 21 is stopped. Specifically, the angle θM is an intermediate angle of the first rotation range R1. The start point θS of the first rotation range R1 is 30°, and the end point θE of the first rotation range R1 is 90°. In the present embodiment, θM is a median value of the start point θS and the end point θE of the first rotation range R1, that is, (θS+θE)/2=60°.

Therefore, in the intermediate value energization drive of the present embodiment, constant voltage corresponding to sin 60° (=cos 30°, Pu shown in FIG. 2) is applied to the U-phase winding 22. Constant voltage corresponding to sin (−60°) (=sin 300°, Pv shown in FIG. 2) is applied to the V-phase winding 22. Constant voltage corresponding to sin (−180°)(=sin 180°, Pw shown in FIG. 2) is applied to the W-phase winding 22.

As shown in FIG. 3, when a signal in which the rotation position of the rotation reference 21a is detected is acquired from the hall element 23 (S4: YES), the waveform control unit 32 outputs a signal for driving the motor 20 by sine wave energization to the waveform output unit 33 (S5). The waveform control unit 32 continues the sine wave energization drive of the motor 20 (S5) until a signal for stopping the motor 20 is acquired from the host device 40 (S6: NO).

After the waveform control unit 32 acquires a stop signal of the motor 20 from the host device 40 (S6: YES), application of voltage to the windings 22 by the waveform output unit 33 is stopped, and the motor 20 (rotation of the rotor 21) stops.

As described above, according to the motor system 10 of the present embodiment, the waveform control unit 32 outputs a signal for driving the motor 20 by intermediate value energization to the waveform output unit 33 after the rotation start signal is acquired from the host device 40 until the signal in which the rotation position of the rotation reference 21a is detected is first acquired from the hall element 23. At this time, voltage corresponding to the sine value of the angle θM is applied to the winding 22 of one phase among the three-phase windings 22. In addition, voltage corresponding to the sine value of an angle having a similar phase difference as that of the sine wave energization drive with respect to the angle θM is applied to the rest of the three-phase windings 22. Therefore, for example, the voltage value applied to the winding 22 of each phase can be set to a suitable value in terms of output efficiency, as compared with the case where the motor 20 is driven by rectangular wave energization at the start of rotation. This allows suppressing the generation of noise and vibration while suppressing the torque drop at a low rotation number.

The angle θM is an intermediate angle of the rotation range having the rotation reference 21a positioned when the rotor 21 is stopped. Therefore, even if the rotation reference 21a of the rotor 21 is located on the start point θS side or on the end point θE side within the rotation range, the voltage value applied to the winding 22 of each phase can be set to a suitable value in terms of output efficiency.

The intermediate angle of the rotation range is not limited to the median value (that is, (θS+θE)/2) of the start point θS and the end point θE of the rotation range.

The intermediate angle of the rotation range may have a difference (for example, 10% of (θE−θS)) with respect to the median value to a degree that does not cause an issue in terms of output efficiency. As shown in the present embodiment, when the rotation position of the rotation reference 21a is detected at a predetermined electric angle of 60°, the intermediate angle of the rotation range may have a difference of about 6° with respect to the median value. For example, the intermediate angle of the first rotation range R1 may be 54° to 66°, and any value of 54° to 66° may be suitably adopted as the angle θM.

The technical scope of the present disclosure is not limited to the above embodiment, and various modifications can be made without departing from the purpose of the present disclosure.

The angle θM does not have to be an intermediate angle of the rotation range having the rotation reference 21a positioned when the rotor 21 is stopped. For example, the angle θM may be another angle included in a rotation range having the rotation reference 21a positioned when the rotor 21 is stopped.

The motor 20 is not limited to a three-phase two-pole motor.

In addition, it is possible to appropriately replace the components in the embodiment with well-known components or appropriately combine the modifications without departing from the purpose of the present disclosure.

What is claimed is:

1. A drive unit for a brushless DC motor including a rotor, n-phase (n is a natural number of two or more) windings that rotate the rotor, and an element that detects a rotation position of a rotation reference provided on the rotor at a predetermined interval, the drive unit comprising:
- a rotation position acquisition unit that acquires a signal from the element;
- a waveform control unit that acquires a signal from each of a host device and the rotation position acquisition unit; and
- a waveform output unit that applies voltage to the n-phase windings based on the signal from the waveform control unit, wherein the waveform control unit
- outputs a signal for driving the brushless DC motor by intermediate value energization to the waveform output unit after a rotation start signal is acquired from the host device until a signal in which the rotation position of the rotation reference is detected is first acquired from the element, and
- outputs a signal for driving the brushless DC motor by sine wave energization to the waveform output unit when the signal in which the rotation position of the rotation reference is detected is acquired from the element, and
- the waveform control unit applies voltage corresponding to a sine value of an angle θM of a winding of one phase of the n-phase windings (the angle θM is a predetermined angle included in a rotation range having the rotation reference positioned when the rotor is stopped among a plurality of rotation ranges that are divided in accordance with the rotation position detected by the element) when the brushless DC motor is to be driven by intermediate value energization, and outputs a signal for applying voltage corresponding to a sine value of an angle having similar phase difference as the sine wave energization drive with respect to the angle θM to the rest of the windings.

2. The drive unit for a brushless DC motor according to claim 1, wherein
- in each of the plurality of rotation ranges, a voltage value applied to each of the n-phase windings from a start point θS to an end point θE of the rotation range at a time of the sine wave energization drive monotonously increases or monotonously decreases, and
- the angle θM is an intermediate angle of the rotation range having the rotation reference positioned when the rotor is stopped.

3. The drive unit for a brushless DC motor according to claim 1, wherein the waveform control unit determines the rotation range having the rotation reference positioned when the rotor is stopped based on the signal from the rotation position acquisition unit.

4. The drive unit for a brushless DC motor according to claim 1, wherein
- the n-phase windings are three-phase windings, and
- the element detects the rotation position of the rotation reference at an interval of an electrical angle of 60°.

5. The drive unit for a brushless DC motor according to claim 1, wherein the element is a hall element.

6. A motor system comprising:
- a brushless DC motor that includes a rotor, n-phase (n is a natural number of two or more) windings that rotate the rotor, and an element that detects a rotation position of a rotation reference provided on the rotor at a predetermined interval; and
- a drive unit for the brushless DC motor comprising:
  - a rotation position acquisition unit that acquires a signal from the element;
  - a waveform control unit that acquires a signal from each of a host device and the rotation position acquisition unit; and
  - a waveform output unit that applies voltage to the n-phase windings based on the signal from the waveform control unit, wherein the waveform control unit
- outputs a signal for driving the brushless DC motor by intermediate value energization to the waveform output unit after a rotation start signal is acquired from the host device until a signal in which the rotation position of the rotation reference is detected is first acquired from the element, and
- outputs a signal for driving the brushless DC motor by sine wave energization to the waveform output unit when the signal in which the rotation position of the rotation reference is detected is acquired from the element, and
- the waveform control unit applies voltage corresponding to a sine value of an angle θM of a winding of one phase of the n-phase windings (the angle θM is a predetermined angle included in a rotation range having the rotation reference positioned when the rotor is stopped among a plurality of rotation ranges that are divided in accordance with the rotation position detected by the element) when the brushless DC motor is to be driven by intermediate value energization, and outputs a signal for applying voltage corresponding to a sine value of an angle having similar phase difference as the sine wave energization drive with respect to the angle θM to the rest of the windings.

7. The motor system according to claim 6, wherein
- in each of the plurality of rotation ranges, a voltage value applied to each of the n-phase windings from a start point θS to an end point θE of the rotation range at a time of the sine wave energization drive monotonously increases or monotonously decreases, and
- the angle θM is an intermediate angle of the rotation range having the rotation reference positioned when the rotor is stopped.

8. The motor system according to claim 6, wherein the waveform control unit determines the rotation range having the rotation reference positioned when the rotor is stopped based on the signal from the rotation position acquisition unit.

9. The motor system according to claim 6, wherein
- the n-phase windings are three-phase windings, and
- the element detects the rotation position of the rotation reference at an interval of an electrical angle of 60°.

* * * * *